Aug. 25, 1942.　　　I. W. LAW　　　2,293,837
LAWN MOWER SHARPENER
Filed Feb. 15, 1941
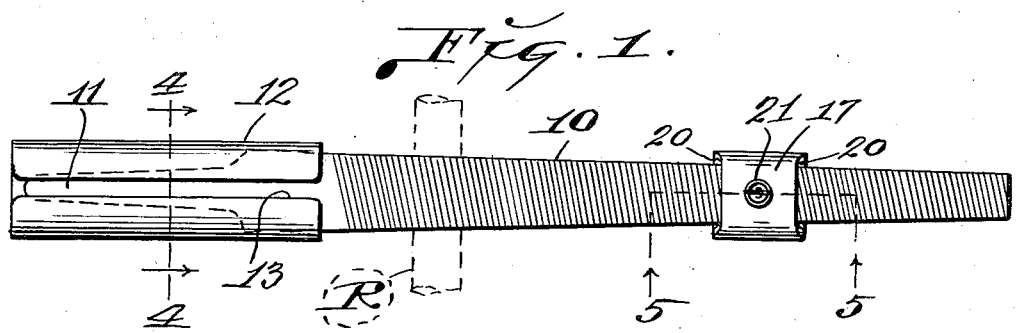
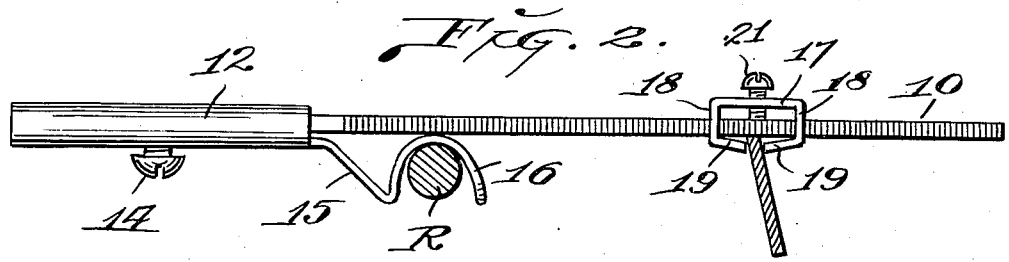
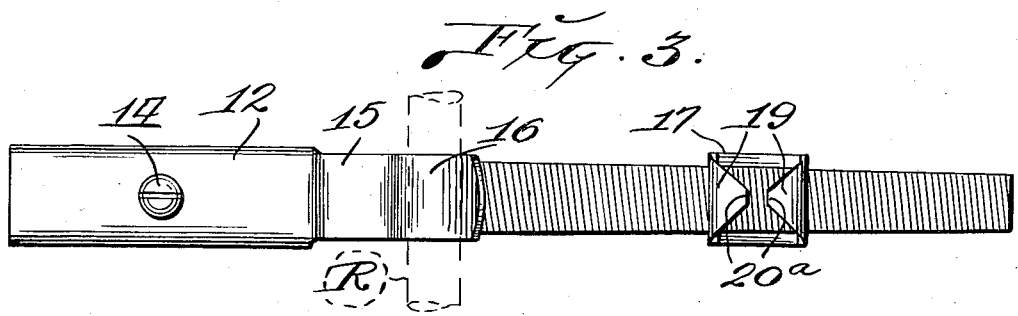
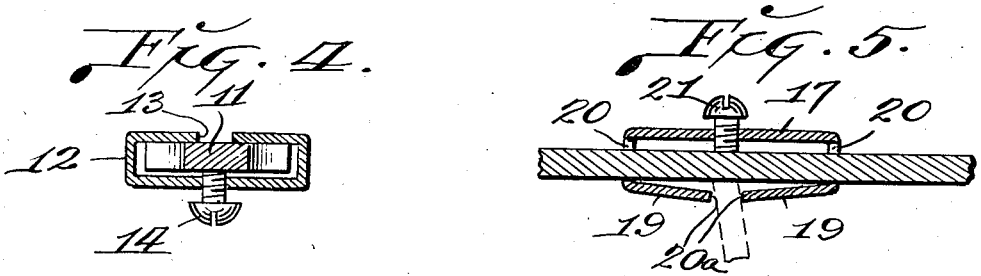
INVENTOR,
IRVINE W. LAW.
By Martin P. Smith
ATTY.

Patented Aug. 25, 1942

2,293,837

UNITED STATES PATENT OFFICE 2,293,837

LAWN MOWER SHARPENER

Irvine W. Law, Long Beach, Calif.

Application February 15, 1941, Serial No. 379,071

2 Claims. (Cl. 76—82.1)

My invention relates to a lawn mower sharpening device and has for its principal object, to provide a relatively simple and inexpensive structure including a conventional flat face file and a pair of members that are adjustably mounted on said file, thereby providing a practical and efficient tool that may be conveniently used for rapidly sharpening the edges of the curved blades of a lawn mower and likewise for sharpening the straight edge of the cutter bar with which the blades cooperate during operation of the lawn mower.

A further object of my invention is, to provide in a lawn mower sharpener of the character referred to a one-piece member having a portion that provides a convenient handle for grasping one end of the file and another portion shaped so as to provide a runner that slides lengthwise upon the tie bar or connecting rod between the sides of the lawn mower, thus guiding the file during blade sharpening operations.

A further object of my invention is, to provide in a lawn mower sharpener a one-piece member that is removably and adjustably applied to the file and which serves as a guide for the edges of the curved blades and also as a guide for the cutter bar during sharpening operations.

With the foregoing and other objects in view, my invention consists in certain novel features of construction and arrangement of parts that will be hereinafter more fully described and claimed and illustrated in the accompanying drawing in which:

Fig. 1 is a top plan view of a lawn mower sharpener constructed in accordance with my invention.

Fig. 2 is a side elevational view of the sharpener and showing the same in position upon the transverse tie rod and one of the curved blades of the lawn mower.

Fig. 3 is a view looking against the under side of the sharpener.

Fig. 4 is an enlarged cross section taken on the line 4—4 of Fig. 1.

Fig. 5 is an enlarged detail section taken on the line 5—5 of Fig. 1.

Referring by numerals to the accompanying drawing which illustrates a preferred embodiment of my invention, 10 designates a file of the type having oppositely disposed flat faces on which are formed conventional file teeth and projecting from one end of the file body is a tapered handle 11.

The member that provides a combined handle and guide for the device, is formed from a single piece of sheet metal, a portion of which is bent to form a flat tube 12 which is approximately three or four inches long in order to be conveniently gripped in the hand of the user, and the cross sectional dimensions of the opening through this tube are slightly larger than the cross sectional dimensions of the rear end of the body of the file 10. Thus the tube may conveniently receive a portion of the rear end of the file body, together with the handle 11 that projects therefrom.

The upper wall of the tube 12 is provided with a longitudinally disposed slot 13.

Screw seated in the central portion of the bottom wall of the tube is a set screw 14 which when tightened against the handle 11 of the file firmly clamps the tube thereto.

Projecting from the inner end of the bottom wall of the tube 12 is an arm 15, the terminal portion of which is bent to form a substantially inverted U-shaped member 16 which when the sharpener is in use engages over the transverse rod R that functions as a tie rod between the side members of the lawn mower frame and as a result of this construction, the sharpener is guided so as to traverse a definite transverse path while being reciprocated during sharpening operations.

Removably and adjustably mounted upon the body 10 of the file is a member that engages the curved blades or the cutter bar of the lawn mower while the same are being sharpened and this member, which is formed from suitable sheet metal, comprises a substantially rectangular top plate 17, end plates 18, and bottom plates 19, which latter are approximately triangular in shape as illustrated in Fig. 3.

The end walls 18 are provided with slots 20 for the reception of the body of the file and passing through the central portion of top plate 17 is a set screw 21 which when tightened bears against the upper surface of the file to firmly secure the guiding member thereto.

From the lower ends of the end walls 18 of this guiding member, the triangular plates 19 extend downwardly at slight angles relative to the plane occupied by the top plate 17 and the flat surfaces of the file to which the guiding member is attached and the apices of the triangular plates are cut away to form short straight parallel edges 20a spaced apart a sufficient distance to receive the curved blades of the lawn mower adjacent their edges (see Figs. 2 and 5).

When the device is used for sharpening the curved blades of lawn mowers, the handle member 12 and blade guiding member are applied to the file 10 as illustrated in Figs. 1 and 2 and after being properly adjusted thereon, they are secured to the file by tightening the screws 14 and 21. Inverted U-shaped member 16 is positioned over the cross bar or tie rod R and the device is manipulated so that the edge of the curved blade to be sharpened is positioned between the edges 20a of the triangular members 19.

The sharpening device is now reciprocated transversely of the lawn mower with the rod 13 serving to guide the sharpening device during such movements and sufficient downward pressure is exerted on the end of the file body opposite the end that is provided with the handle, so as to cause the teeth on the under surface of the file to engage and abrade the cutting edge of the blade so as to effectively sharpen same.

During this sharpening action, it will be understood that the blade that is being sharpened will swing or rotate slightly due to its longitudinal curvature, but such movement does not affect the sharpening of the cutting edge of said blade.

To sharpen the edge of the cutter bar of the lawn mower against which the sharp edges of the blades engage, the guide member comprising the parts 17, 18, and 19, is positioned and adjusted upon the body of the file so that the outer face of one of the end walls 18 engages against the side face of the cutter bar adjacent its cutting edge and thus the file when reciprocated abrades and consequently sharpens the cutting edge of said cutter bar.

Thus it will be seen that I have provided a lawn mower sharpener that is relatively simple in construction, inexpensive of manufacture, and very effective in performing the functions for which it is intended.

It will be understood that minor changes in the size, form and construction of the various parts of my improved lawn mower sharpener, may be made and substituted for those herein shown and described, without departing from the spirit of my invention, the scope of which is set forth in the appended claims.

I claim as my invention:

1. In a lawn mower sharpener, the combination with a file, of a flat tube detachably and adjustably applied to one end of said file, the length of which tube is such as to provide a handle for gripping and manipulating the file, a set screw seated in one of the walls of said tubular handle for clamping the same to the file, an arm projecting inwardly from the inner end of said tubular handle, the inner portion of which arm terminates in an inverted U-shaped member that is adapted to engage the transverse tie rod of the lawn mower on which the sharpener is used and a combined blade and cutter bar guide detachably and adjustably mounted on the body of the file.

2. In a lawn mower sharpening device, the combination with a flat faced file, of a flat tube removably positioned upon one end of said file, the length of which tube is such as to provide a handle for gripping and manipulating said file, means carried by said tube for clamping the same to said file in differently adjusted positions, an arm projecting from the inner end of said tubular handle, an inverted U-shaped member formed on said arm for engaging the transverse tie rod of a lawn mower and a combined lawn mower blade and cutter bar guide removably and adjustably mounted on said file.

IRVINE W. LAW.